(12) United States Patent
Dalrymple et al.

(10) Patent No.: US 7,190,487 B2
(45) Date of Patent: Mar. 13, 2007

(54) COLOR CONVERSION WITH HUE STRAIGHTENING USING MULTIPLE LOOK-UP TABLES AND INTERPOLATION

(75) Inventors: John Charles Dalrymple, Portland, OR (US); James Zhixin Chang, Vancouver, WA (US); Chizu Inoue, Chiba (JP)

(73) Assignee: Sharp Laboratories of America, Inc., Camas, WA (US)

( * ) Notice: Subject to any disclaimer, the term of this patent is extended or adjusted under 35 U.S.C. 154(b) by 998 days.

(21) Appl. No.: 10/156,279

(22) Filed: May 27, 2002

(65) Prior Publication Data

US 2003/0072016 A1 Apr. 17, 2003

Related U.S. Application Data

(60) Provisional application No. 60/390,283, filed on Oct. 23, 2001, provisional application No. 60/324,862, filed on Sep. 25, 2001.

(51) Int. Cl.
*G06F 15/00* (2006.01)

(52) U.S. Cl. .................. 358/1.9; 358/520; 358/3.23; 358/515; 358/518; 358/525; 345/604; 345/606; 345/601; 345/602; 382/167; 382/300

(58) Field of Classification Search ........... 358/520, 358/1.9, 3.23, 515, 518, 525; 345/604, 606, 345/601, 602; 382/167, 300
See application file for complete search history.

(56) References Cited

U.S. PATENT DOCUMENTS

| | | | |
|---|---|---|---|
| 4,500,919 A | 2/1985 | Schreiber | |
| 4,636,844 A | 1/1987 | Sasaki | |
| 4,649,423 A * | 3/1987 | Hoffrichter et al. | 358/520 |
| 4,814,891 A * | 3/1989 | Uchiyama et al. | 358/296 |
| 4,845,550 A * | 7/1989 | Urabe et al. | 358/520 |
| 4,908,701 A | 3/1990 | Udagawa | |
| 4,965,664 A | 10/1990 | Udagawa et al. | |
| 4,977,448 A | 12/1990 | Murata et al. | |
| 4,989,079 A * | 1/1991 | Ito | 358/520 |
| 5,113,248 A | 5/1992 | Hibi et al. | |
| 5,146,328 A | 9/1992 | Yamasaki et al. | |
| 5,428,465 A * | 6/1995 | Kanamori et al. | 358/518 |
| 5,504,821 A | 4/1996 | Kanamori et al. | |
| 5,615,312 A | 3/1997 | Kohler | |
| 5,715,376 A * | 2/1998 | Nakayama | 358/1.9 |
| 5,717,839 A | 2/1998 | Ichikawa | |
| 5,719,689 A | 2/1998 | Terada | |

(Continued)

*Primary Examiner*—Kimberly Williams
*Assistant Examiner*—Beniyam Menberu
(74) *Attorney, Agent, or Firm*—Robert D. Varitz, PC

(57) ABSTRACT

A method of color conversion includes providing a first color domain input signal set having plural input signals; sorting the input signals of the first color domain input signal set according to signal intensity; designing and generating plural 1-D look-up table sets for color polyhedrons; selecting a set of look-up tables for use with a specific color polyhedron, wherein said selecting is a function of a section of the polyhedron determined as a function of the input signal set; looking up values in the look-up table set as a function of the input signal set; generating weights as a function of the sorted signal intensities; and interpolating the output from the selected look-up tables as a function of the selected look-up table and the generated weights to produce a color domain signal set which is converted to a desired color domain signal set.

34 Claims, 11 Drawing Sheets

U.S. PATENT DOCUMENTS

| | | | |
|---|---|---|---|
| 5,754,316 A * | 5/1998 | Hayashi et al. | 358/518 |
| 5,764,388 A | 6/1998 | Ueda et al. | |
| 5,799,105 A * | 8/1998 | Tao | 382/167 |
| 5,828,816 A | 10/1998 | Kise et al. | |
| 5,887,124 A | 3/1999 | Iwasaki et al. | |
| 5,894,358 A | 4/1999 | Ebner et al. | |
| 5,933,252 A | 8/1999 | Emori et al. | |
| 5,987,168 A | 11/1999 | Decker et al. | |
| 6,002,806 A * | 12/1999 | Morikawa | 382/274 |
| 6,038,373 A * | 3/2000 | Matsumoto et al. | 358/1.9 |
| 6,039,434 A | 3/2000 | Moroney | |
| 6,057,931 A | 5/2000 | McConnell et al. | |
| 6,061,501 A | 5/2000 | Decker et al. | |
| 6,118,549 A * | 9/2000 | Katougi et al. | 358/1.9 |
| 6,137,594 A | 10/2000 | Decker et al. | |
| 6,137,596 A | 10/2000 | Decker et al. | |
| 6,140,997 A | 10/2000 | Tanaka | |
| 6,191,874 B1 | 2/2001 | Yamada et al. | |
| 6,229,580 B1 | 5/2001 | Inoue | |
| 6,281,984 B1 | 8/2001 | Decker et al. | |
| 6,304,671 B1 * | 10/2001 | Kakutani | 382/167 |
| 6,373,580 B1 * | 4/2002 | Walker | 358/1.1 |

* cited by examiner (a) $C_i \geq M_i \geq Y_i$ (b) $C_i \geq Y_i \geq M_i$ (c) $M_i \geq C_i \geq Y_i$ (d) $M_i \geq Y_i \geq C_i$ (e) $Y_i \geq C_i \geq M_i$ (f) $Y_i \geq M_i \geq C_i$ (a) (b)

COLOR CONVERSION WITH HUE STRAIGHTENING USING MULTIPLE LOOK-UP TABLES AND INTERPOLATION

RELATED APPLICATIONS

This application is related to U.S. patent application Ser. No. 09/741,458, filed Dec. 19, 2000, for Black Generation Method for CMYK Color Printers Using Multiple Lookup Tables and Interpolation, and claims priority from U.S. Provisional Patent Ser. No. 60/324,862 for Color Conversion with Hue Straightening using Multiple Lookup Tables and Interpolation, filed Sep. 25, 2001, and U.S. Provisional Patent Ser. No.: 60/390,283 for Color Conversion with Hue Straightening using Multiple Lookup Tables and Interpolation, filed Oct. 23, 2001.

FIELD OF THE INVENTION

This invention is in the field of color conversion for digital imagery, and pertains specifically to a method of converting RGB input signals into printer CMYK signals for printers having four colorants: cyan (C), magenta (M), yellow (Y), and black (K), and to general color conversion methods, such as color correction for LCD displays.

BACKGROUND OF THE INVENTION

Many color-printing devices use cyan (C), magenta (M), yellow (Y), and black (K) colorants, referred to collectively as CMYK colorants. In CMYK output devices, many colors are reproducible by more than one combination of CMYK colorants. When a CMYK device is modeled as an RGB device, each RGB combination must produce a unique CMYK combination. Under-color removal (UCR) and gray component replacement (GCR) techniques are traditionally used to calculate these unique combinations. These techniques are simple to implement, but cannot fully utilize the color gamut possible with the additional K colorant. Other brute-force techniques that search the entire CMYK signal space for desirable combinations can produce good results but are unsuitable for real-time implementation.

A number of advantages are gained by using a K colorant in addition to CMY colorants. These include denser blacks, better shadow details, and easier control of neutral color balance. In profiling a CMYK printer for color management, combinations of the C, M, Y, and K colorants are computed to reproduce colors specified in a colorimetric space, such as CIELAB or sRGB. As previously noted, some colors may be reproducible via multiple CMYK combinations. In UCR and GCR techniques, RGB signals are first inverted to obtain nominal CMY signals. Then, based on the composition of the CMY colorants, the K colorant is used to replace certain amounts of the CMY colorants. The amounts of K colorant used and CMY colorants removed usually depend on the minimum of the input C, M, and Y amounts. A typical implementation uses one black generation (BG) curve and three UCR curves. These curves may be implemented as 1-D LUTs (look-up tables) where the minimum of the C, M, and Y signals is used as the index into the LUTs. This provides a model for converting nominal RGB signals into printer CMYK signals.

With such a model, the printer may be considered to be an RGB printer, where the RGB signals have a one-to-one correspondence with the colors specified in a colorimetric space for all the in-gamut colors. To profile an RGB printer, an RGB printer target containing color patches, which extensively sample the input RGB cube, may be generated, and the output CIELAB values then measured. Based on the measurement data, a printer profile may be created which converts colors specified in a colorimetric space to the printer RGB space. Gamut mapping techniques are used to reproduce out-of-gamut colors. Clearly, an RGB printer model is very useful in the modular design of a printer profiling process. Such a technique hides the complexity of the RGB-to-CMYK conversion process and provides users a more intuitive RGB input color space. There are also applications, such as Windows® Graphical Display Interface (GDI) printing, where the printer is only addressable as an RGB device, which necessitates the construction of RGB printer models.

The simple UCR/GCR technique mentioned above does not provide enough flexibility to select a "best" CMYK combination to reproduce a specified color. The color gamut of the resulting RGB printer is also reduced, due to the inability of the simple technique to use certain combinations of CMYK values.

More sophisticated methods for controlling the CMYK usage generally search the entire gamut of the CMYK printer to obtain the desired CMYK signals. Consider a color specified in a colorimetric space: if it is an in-gamut color, the search will find one or more CMYK signal vectors that reproduce the input color. These CMYK signals may be sorted by the amount of K colorant used, from the minimal to the maximum amount. The desired CMYK signals are obtained by specifying the relative amount of K colorant to be used. One way to do this is to use a coefficient to specify the amount of K to be used relative to the minimum and maximum K amounts in the CMYK signal vectors found. This coefficient may be designed to be a function of position in the input color space to achieve optimal output image quality. These methods take advantage of the full CMYK printer gamut.

However, constructing a printer target that extensively samples the entire printer CMYK space, measures the printed target in a colorimetric space, such as CIELAB, and interpolates to find all possible CMYK signals for each in-gamut color specified in the colorimetric space is a computationally intensive, "brute force" method. Furthermore, the output CMYK signals are not associated with input colors in an RGB signal space, but with colors in colorimetric space. Therefore, these methods alone are not sufficient for modeling a CMYK printer as an RGB printer, although they are useful in creating a 3-D color LUT that converts colors in a colorimetric space directly to printer CMYK signals. Of course, gamut mapping techniques must also be incorporated into this LUT creation process.

The use of a black (K) colorant in printing achieves a higher density than that achievable by combining CMY colorants alone. The problem to be solved is how to determine the amount of black colorant to be used based on an RGB or CMY input, and how to adjust the other colorants once black colorant is introduced. As previously noted, the prior art offers two main ways to solve this problem: (1) UCR-type techniques, and (2) search techniques. The related patent application describes a method of using interpolation and multiple black generation LUTs on the boundaries and the center diagonal of a CMY cube in a method for converting input RGB signals into CMYK signals.

U.S. Pat. No. 6,281,984, granted Aug. 28, 2001, to Decker et. al., for Enhanced System, Method, and Program for Converting an Externally Defined Four Dimensional Colorant (CMYK) into an Equivalent Four Dimensional Colorant Defined in Terms of the Four Inks (C'M'Y'K') That Are Associated with a Given Printer, describes conversion of Lab values into CMYK values.

U.S. Pat. No. 6,229,580, granted May 8, 2001, to Inoue, for Image Color Correction Apparatus and Recording Medium Having Color Program Recorded Thereon, describes color correction of a particular color tone and tones related to the particular color tone.

U.S. Pat. No. 6,191,874, granted Feb. 20, 2001, to Yamada et. al., for Image Processing Apparatus and Method, and a Recording Medium, describes extraction of an achromatic color component and processing a CMY signal as a function of the achromatic color component.

U.S. Pat. No. 6,140,997, granted Oct. 31, 2000, to Tanaka, for Color Feature Extracting Apparatus and Method Therefor Capable of Easily Transforming a RGB Color Space into a Color Space Close to Human Sense, describes color processing by transforming each RGB pixel into a hue, saturation and lightness (HLS) value.

U.S. Pat. No. 6,137,596, granted Oct. 24, 2000, to Decker et. al., for System, Method, and Program for Converting Three Dimensional Colorants to More Than Three Dimensional Colorants, U.S. Pat. No. 6,137,594, granted Oct. 24, 2000, to Decker et. al., for System, Method and Program for Converting an Externally Defined Colorant CMYK into an Equivalent Colorant (C'M'Y'K') Associated with a Given Printer, and U.S. Pat. No. 6,061,501, granted May 9, 2000, to Decker et. al., for System, Method and Program for Converting an Externally Defined Four Colorant (CMYK) into an Equivalent Four Dimensional Colorant Defined in Terms of the Four Inks (C'M'Y'K') That Are Associated with a Given Printer, describe combining color patches of a color space with patches of a black color space and inverting the color point values as a function of the black color space based on measured Lab values.

U.S. Pat. No. 6,057,931, granted May 2, 2000, to McConnell et. al., for Method and Apparatus for Controlling Color Image Reproduction, describes color correction of pixelated images by HSL values.

U.S. Pat. No. 6,039,434, granted Mar. 21, 2000, to Moroney, for Thresholded Undercolor Removal and black Replacement in a Thermal-Ink jet Printer or Plotter, describes conversion of a RGB signal into a subtractive color domain.

U.S. Pat. No. 5,987,168, granted Nov. 16, 1999, to Decker et. al., for System, Method, and Program for Converting Three Dimensional Colorants to More Than Three Dimensional Colorants, describes generation of a LUT to convert a three-color space to a four-color space.

U.S. Pat. No. 5,933,252, granted Aug. 3, 1999, to Emori et. al., for Color Image Processing Method and Apparatus Therefor, describes conversion of a broad color space to a narrow color space while maintaining color continuity.

U.S. Pat. No. 5,894,358, granted Apr. 13, 1999, to Ebner et. al., for Adaptable Color Density Management System, describes a UCR technique by summing total toner coverage and elective toner reduction.

U.S. Pat. No. 5,887,124, granted Mar. 23, 1999, to Iwasaki et. al., for Image Processing Apparatus and Method in Which a Restriction Process Is Performed According to Color Component Values, describes restricting colorant use.

U.S. Pat. No. 5,828,816, granted Oct. 27, 1998, to Kise et. al., for Image Processing Apparatus and Image Processing Method, describes a technique for improving blue color representation.

U.S. Pat. No. 5,764,388, granted Jun. 9, 1998, to Ueda et. al., for Method and Device for Converting Color Signal, describes conversion of a color space signal to a signal having color space and achromatic space components.

U.S. Pat. No. 5,719,689, granted Feb. 17, 1998, to Terada, for Image Processing Apparatus, describes use of a gray-component extracting unit to convert a color space signal into a color space and a black signal.

U.S. Pat. No. 5,717,839, granted Feb. 10, 1998, to Ichikawa, for Image Processor and Printer Having Correction Table Data for an External Source Transferred to the Printer, describes an image correction LUT to correct an image depending on the image input device and the image printer.

U.S. Pat. No. 5,615,312, granted Mar. 25, 1997, to Kohler, for Color Management System Having Business Graphics Rendering Mode, describes a BGR technique which enhances color images.

U.S. Pat. No. 5,504,821, granted Apr. 2, 1996, to Kanamori et. al., for Color Converting Apparatus for Performing a Three-Dimensional Color Conversion of a Colored Picture in a Color Space with a Small Capacity of Memory, describes use of LUTs and color cubes to perform color space conversions.

U.S. Pat. No. 5,146,328, granted Sep. 8, 1992, to Yamasaki et. al., for Color Signal Network System, describes a conversion system for converting color signals to a suitable output format on a network having a variety of input and output devices.

U.S. Pat. No. 5,113,248, granted May 12, 1992 to Hibi et. al., for Method and Apparatus for Color Removal in a Picture Forming Apparatus, describes a UCR system to provide color correction.

U.S. Pat. No. 4,977,448, granted Dec. 11, 1990, to Murata et. al., for Color Image Processing Apparatus Having Exact Color Reproduction Capability, describes a system for correcting various color characteristics.

U.S. Pat. No. 4,965,664, granted Oct. 23, 1990, to Udagawa et. al., for Color Image Signal Processing Method and Apparatus for Recording a Color Image from Input Color Image Signals by Converting an Individual Color Signal Component, describes conversion of luminous, hue and chromatic signals into various output color space paradigms.

U.S. Pat. No. 4,908,701, granted Mar. 13, 1990, to Udagawa, for Color Image Processing and Apparatus for Color Adjustment During Image Processing, describes correction of colors as a function of a dark point color component.

U.S. Pat. No. 4,649,423, granted Mar. 10, 1987, to Hoffrichter et. al., for Method and Circuit Arrangement for Selective Correction of Hues and Colors, describes correction of color separations by processing HSL signals.

U.S. Pat. No. 4,636,844, granted Jan. 13, 1987, to Sasaki, for Method of Processing a Color Image Signal, describes processing a black signal as a function of color separation.

U.S. Pat. No. 4,553,835, granted Nov. 19, 1985, to Morgan, Jr., for Process for Producing Pre-Press Color Proofs, describes preparation of color separation proofs as a function of the yellow content of an image.

U.S. Pat. No. 4,500,919, granted Feb. 19, 1985, to Schreiber, for Color Reproduction System, describes use of tristimulus values on a CRT to correct final print color values.

SUMMARY OF THE INVENTION

A method of color conversion includes providing a first color domain input signal set having plural input signals; sorting the input signals of the first color domain input signal set according to signal intensity; designing and generating plural 1-D look-up table sets for color polyhedrons; selecting a set of look-up tables for use with a specific color polyhedron, wherein said selecting is a function of a section of the polyhedron determined as a function of the input signal set; looking up values in the look-up table set as a function of the input signal set; generating weights as a function of the sorted signal intensities; and interpolating the output from the selected look-up tables as a function of the selected look-up table and the generated weights to produce a color domain signal set which is converted to a desired color domain signal set.

It is an object of the invention is to provide a model for converting nominal RGB signals into printer CMYK signals.

Another object of the invention is to provide a color conversion method which allows localized control to convert RGB signals to CMYK signals.

A further object of the invention to provide a color conversion method using multiple one-dimensional look-up tables (LUTs) to control CMYK colorant usage.

Another object of the invention is to provide a color conversion method which uses LUTs on a center diagonal and boundaries of an input color cube.

Still another object of the invention is to provide a color conversion method which uses most of the available CMYK gamut.

Yet another object of the invention is to provide a method of correcting for discernable hue shifts.

Another object of the invention is to provide a method of maintaining a neutral gray scale, accurate hue angles, and proper perceptual spacing in color ramps from black to primary and black to secondary colors.

A further object of the invention is to provide hue correction for primary colors and secondary colors.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

The method of the invention includes a flexible computational structure for converting RGB (Red Green Blue) or CMY (Cyan Magenta Yellow) signals to CMYK (Cyan Magenta Yellow black) signals. This structure, which may be viewed as an extension of the traditional Under-Color Removal (UCR) and Gray Component Replacement (GCR) techniques, uses multiple sets of 1-D CMYK look-up tables (LUTs) to control the CMYK colorant usage. The LUTs are strategically placed on the center diagonal and boundaries of the input signal color cube. By properly designing these LUTs, a model for RGB-to-CMYK conversion is obtained which utilizes most of the available CMYK gamut and also corrects certain non-ideal device behaviors, such as hue shifts along lines from the pure colors to black or white, which may result from downstream halftoning and page marking processes. For example, the LUTs may be constrained so that the hue angles in ramps from pure colors to white or black will remain constant.

This invention solves the problem of correcting certain suboptimal color behaviors of "raw" (un-calibrated) output devices. In color printing applications, the method of the invention is used for converting input RGB signals, as generally used in display monitors, digital cameras, and scanners, into amounts of CMYK colorants, as used in most color printers, e.g., ink jet or laser printers. The methods disclosed herein may also be applied in correcting certain strongly nonlinear colorimetric behaviors of LCD display devices. In the latter case, the invention computes an RGB-to-RGB transform rather than an RGB-to-CMYK transform. The computational structure is slightly different for this application, since only three channels need to be computed, but the principles are the same.

The method of the invention is an efficient computational structure for determining a non-linear RGB to CMYK, RGB to RGB, or RGB to any other color space, transform, which may be used to treat a CMYK printer as an RGB printer. Efficient table look-up and interpolation techniques, to obtain the output signals based on the locations of the input RGB points within the RGB color cube, are included in the method of the invention. The preferred embodiment of the method of the invention is described herein in the application of this computational structure to CMYK printers. The extension to color printers using more than four colorants, such as Hexachrome™ printers or printers with CMYK plus light cyan and light magenta colorants, is straightforward, and believed to be within the abilities of one of ordinary skill in the art once the method of the invention is understood.

By way of additional background, the simple implementations of the traditional UCR and GCR techniques are reviewed. The method of the invention extends this simple implementation to an efficient computational structure that allows for more flexibility in controlling output colorant usage.

Traditional UCR and GCR Implementation

Figure 1:
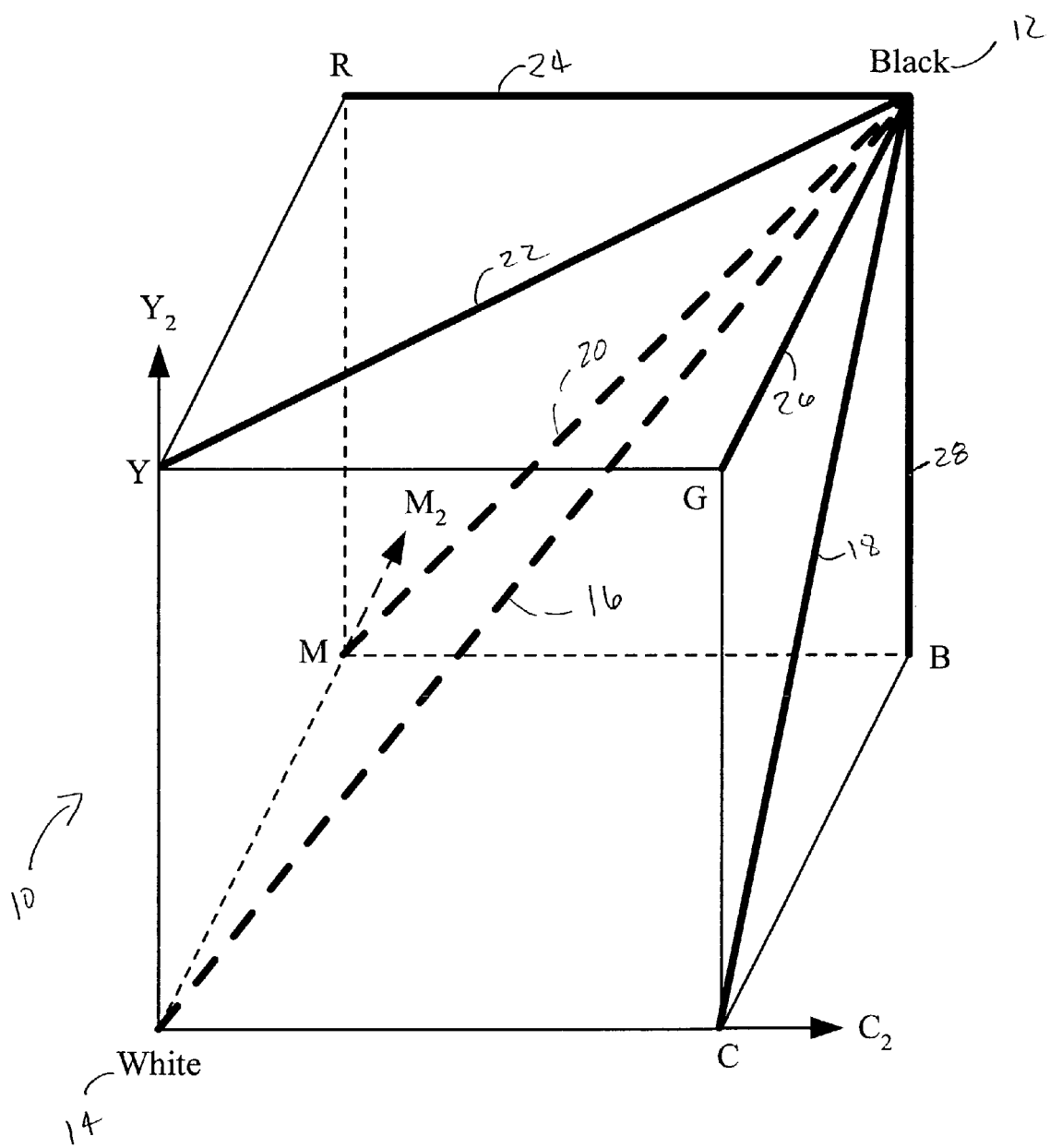
FIG. 1 depicts the input CMY cube for lower half hue straightening and black generation.

The input RGB signal space may be conceptually viewed as either an RGB or a CMY color cube 10, as shown in FIG. 1. Considering a Black point 12, where the RGB signals are zero, to be the origin, then its three axes are R, G, and B, respectively, and the cube is an RGB cube. Alternatively, one may consider a White point 14, where the CMY signals are zero, as the origin, and the cube is then a CMY cube. That is, the RGB cube and the CMY cube describe the same input signal space. Here, the RGB and CMY signals are naturally related by:

$$C=1.0-R, M=1.0-G, \text{ and } Y=1.0-B \quad (1)$$

The general shapes of the black generation (BG) and UCR curves are illustrated in FIG. 2(a). There are three UCR curves: C, dash-double dot; M, dashed; and Y, dash-dot, respectively. Usually, the curves slightly differ from each other by design, to achieve visually neutral rendering of colors residing on the center black-to-white diagonal, line 16 of FIG. 1, of the input signal cube. These curves are easily implemented as 1-D LUTs, and the index into the LUTs is the minimum of the input C, M, and Y signals:

$$K_i = \min(C_i, M_i, Y_i) \quad (2)$$

For arbitrary input CMY signals, the output CMYK signals are obtained by:

$$C_O=C_i-UCR_c(K_i), M_O=M_i-UCR_m(K_i), Y_O=Y_i-UCR_Y(K_i), \text{ and } K_O=BG(K_i)$$

where "UCR" and "BG" denote the UCR and BG functions in FIG. 2(a). The subscript "o" denotes output and "i" input.

Figure 2:
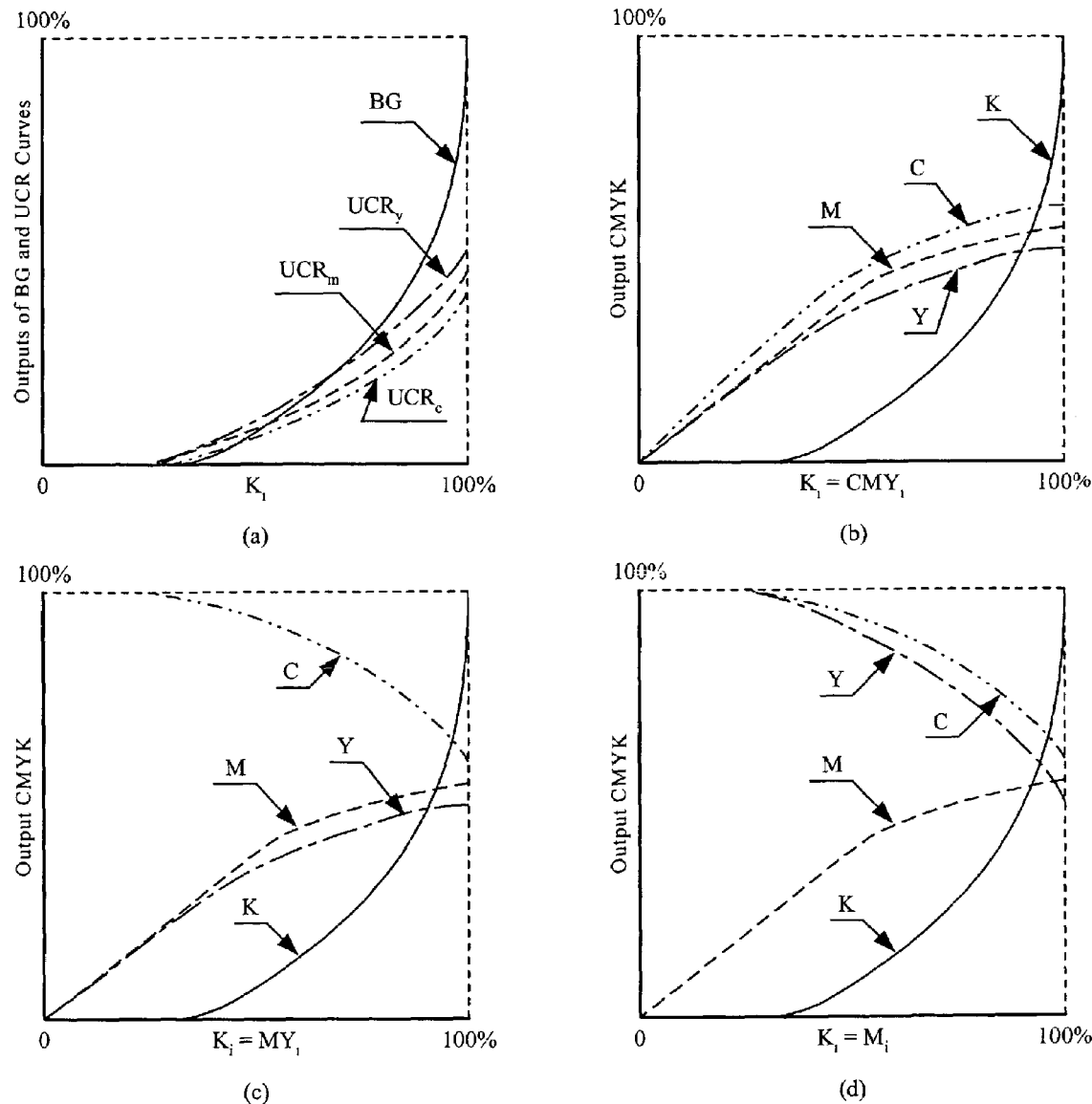
FIG. 2 depicts BG and UCR curves and their relationship with 1-D output CMYK response curves: (a) BG and UCR curves, (b) CMYK response curves on the center diagonal, (c) CMYK response curves on the C to black boundary, and (d) CMYK response curves on the G to black boundary.

From Eq. (3) and FIG. 2(a), at the Black point, 100% K is used and the CMY amounts are significantly reduced. The reason for using 100% K at the Black point is that the K colorant may reproduce dense neutral black. The CMY amounts at black are reduced as necessary to satisfy any total colorant coverage limits of the printing process. As colors become lighter, the K amount is reduced at a relatively rapid rate, while the amount of C, M, and Y reduction is diminished more gradually. On the center diagonal of the input cube, the C, M, and Y signals are equal, which is referred to as the input CMY signal. The signals range from 0% at the White point to 100% at the Black point. By combining Eq. (3) and FIG. 2(a) on center diagonal 16, the 1-D output CMYK curves on center diagonal 16, as shown in FIG. 2(b), are obtained. On center diagonal 16, these 1-D curves may be used to obtain output CMYK signals. On the boundary color line segment from pure cyan to black 18, C to black, the input C signal is fixed at 100%, the input M and Y signals are equal, which is referred to as the input MY signal. These signals increase from 0% at C to 100% at black. By applying Eq. (3) and FIG. 2(a), the relationship between the output CMYK signals and the input MY signal on C to black color line segment 18, also referred to herein as an achromatic line segment, is obtained, as shown in FIG. 2(c). Similar 1-D output CMYK responses may be obtained on the M to black color line segment 20, Y to black color line segment 22, R to black color line segment 24, G to black color line segment 26, and B to black color line segment 28. These are shown in heavy lines in FIG. 1. Another example is shown in FIG. 2(d), which illustrates the output CMYK responses on G to black color line segment 26, where the input C and Y signals are fixed at 100% and the M signal goes from 0% at M to 100% at black. The curves shown in FIG. 2 are for illustrative purposes only; the relationships between FIG. 2(a) and FIGS. 2(b)–(d) are approximate.

Thus, the BG and UCR curves may be used to derive 1-D output CMYK response curves on the center diagonal and six boundaries, i.e., color line segments, or simply, line segments, from pure colors to the Black point on the input CMY cube. This also shows why this implementation of BG and UCR curves is not flexible. From the derivation, it may be seen that if the CMYK response curves on the center diagonal as shown in FIG. 2(b) are specified, the BG and UCR curves in FIG. 2(a), and the CMYK response curves on the boundaries may also be derived. By properly designing the CMYK response curves on the center diagonal, the output color ramps on that diagonal may be constrained to remain neutral. The curves may be designed to make the L* response of the output ramp perceptually linear with respect to the input CMY signals on the center diagonal. However, if the output response curves are designed to satisfy some constraints on the center diagonal, the responses on the boundaries are also fixed. This inability to independently specify different CMYK responses in different regions of the input CMY cube is the main reason why the traditional UCR and GCR approach is not flexible and cannot utilize the full gamut of a CMYK printer.

The following description is couched in terms of the CMYK printing of RGB imagery. If the output CMYK response curves on the center diagonal and the six boundary color line segments from C, M, Y, R, G, and B, to black, respectively, can be independently specified, a more flexible control of the CMYK usage may be achieved. This is an important feature of the invention. However, the relationship in Eq. (3) is no longer valid, so the traditional UCR and GCR implementations based on BG and UCR curves no longer work. The computational structure of the method of the invention embodies an efficient interpolation algorithm that takes advantage of independently or locally specified CMYK response curves to convert input RGB signals into CMYK signals. Analogous comments apply in other applications, such as color correction of LCD's.

As discussed above and in the above-identified related application, UCR-type techniques are not flexible enough to obtain the optimal CMYK colorant amounts for all input RGB colors. Also, alternative methods which require extensive searching are computationally intensive. While they are useful in generating 3-D color LUTs off-line, they are not suitable as a stand-alone computational structure for converting RGB signals into CMYK signals. The technique described in the related application uses interpolation and multiple black generation LUTs to increase the flexibility of K usage as compared to traditional UCR-type techniques. However, in the related application, CMY usage is still not very flexible.

Referring again to FIG. 1, in addition to the black generation LUTs, the present method of the invention also provides C, M, and Y LUTs on the center diagonal from black to white, and on loci from black to the pure primary and secondary colors on the boundary of the CMY cube. The present invention thus increases the flexibility of CMY colorant usage. By properly designing these CMY LUTs, a neutral gray scale, accurate hue angles, and proper perceptual spacing in color ramps from black to primary and black to secondary colors, may be maintained. Furthermore, in the present method of the invention, LUTs are also defined on loci from the primary and secondary colors to white. By proper design of these LUTs, the hue angles and perceptual spacing of color ramps from white to the primary and secondary colors may also be controlled.

The computational complexity of the required calculations is modest, in realizing the above-described benefits. The computations are suitable for embodiment in hardware or software. The locus of pure colors is the closed polyhedron whose vertices (in cyclic order) are R, Y, G, C, B, and M. In this disclosure, the terms "upper half" and "lower half" are used loosely to indicate loci on the surface of the RGB/CMY color cube. "Upper half" refers to portions on the surface between the pure colors and white; i.e., the three color cube faces that intersect at the White point. "Lower half" refers to portions on the surface from the pure colors to black; i.e., the three color cube faces that intersect at the Black point. It will be understood by those of ordinary skill in the art that the method of the invention is used to fix specific problems in the upper or lower half of the cube, however, the color range of the entire cube is examined and altered from the perspective of the upper half or lower half.

The following refers to "color domains" and "color domain signal sets." Conversion from a set of color domains and an associated set of color domain signals is explained by way of examples, which are simply that: examples. A color domain signal set is selected for input, and referred to herein as the first color domain, or first color domain signal set. The final color domain, final color domain signal set, or final colorant signal set is referred to as the third color domain, etc., and is selected to provide a signal set for a specific output device, such as a printer, copier, LCD, etc. Usually, an intermediate color domain signal set of an intermediate, or second color domain, is generated using the method of the invention.

Figure 3:
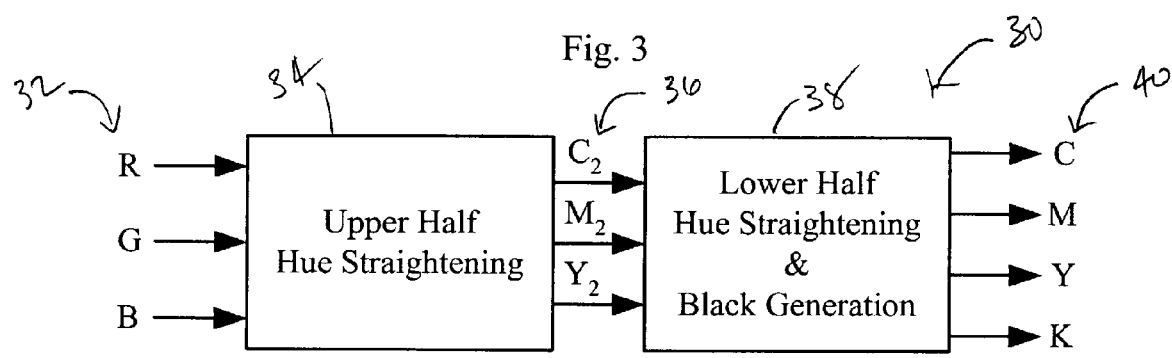
FIG. 3 depicts the structure of RGB-to-CMYK conversion.

The general structure of an RGB-to-CMYK conversion module in accordance with the invention is illustrated in FIG. 3, generally at 30. The first step is to route RGB signals, 32, a signal set from a first color domain, through an "Upper Half Hue Straightening," or first, processing block 34, to obtain a second set of signals 36, which are $C_2M_2Y_2$ signals, a second, or intermediate, color domain. $C_2M_2Y_2$ signals 36 are further processed by a "Lower Half Hue Straightening & Black Generation," or second, processing block 38 to obtain a final set of CMYK colorant signals 40, a signal set from a third color domain. All colors are processed by the method of the invention in the sense that they are transformed form one color domain to another color domain, thus, as used herein, "processing" refers to an alteration of some, likely most, colors throughout the cube.

Figure 4:
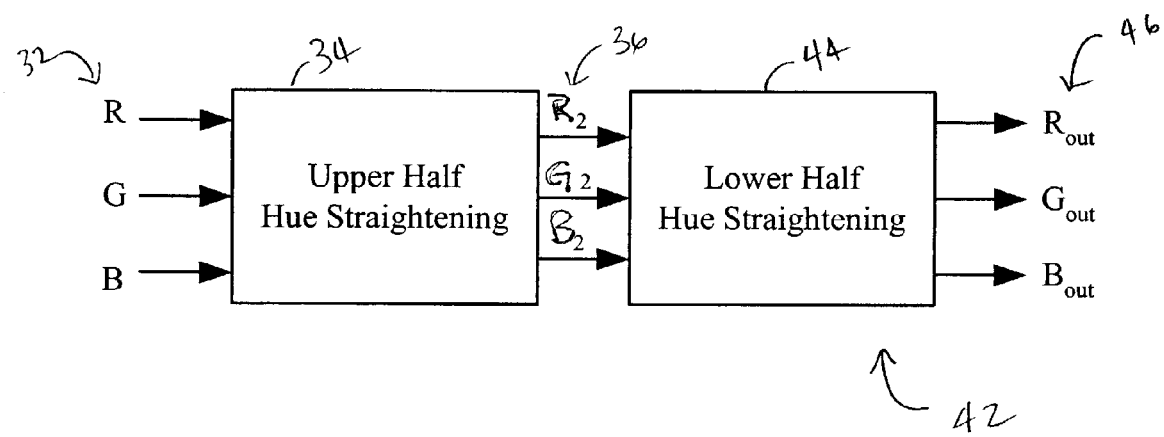
FIG. 4 depicts the structure of RGB to RGB conversion.

The general structure of an RGB-to-RGB conversion module in accordance with the invention is illustrated in FIG. 4, generally at 42. The first step is to route RGB signals 32 through Upper Half Hue Straightening processing block 34 to obtain second signal set 36. Signal set 36 may be RGB or CMY signals. These signals are further processed by a "Lower Half Hue Straightening" processing block 44 to obtain final RGB colorant signals 46, referred to herein as a modified first color domain signal set.

The RGB-to-CMYK processing is described next. In the method of the invention as used for printing, conversion module 38 is first designed and constructed. The input CMY cube of FIG. 1 is used for processing block 38. The parameters for this processing block are seven sets of C, M, Y, and K 1-D LUTs on the center diagonal from white to black and boundary line segments from R, G, B, C, M, and Y to black, respectively, which form polyhedrons, and specifically form tetrahedra, within the color cube, referred to herein as color tetrahedra or color polyhedrons. The line segments on which the C, M, Y, and K 1-D LUTs are defined are shown in heavy lines in FIG. 1. The locations where these 1-D LUTs are defined are the same as those in the related application, however, in that method, only a single 1-D LUT, the K LUT, was defined on these loci. In the present invention, four 1-D LUTs, for C, M, Y, and K, respectively, are defined on these loci. The placement of CMYK LUTs enables flexible control of the output CMY colorants as well as the K colorant. The CMYK LUTs on the center diagonal and the boundary line segments directly determine the output CMYK values on those line segments. The output CMYK values for input CMY points not on those line segments are obtained by triangular interpolation based on the output values on those line segments, explained in connection with FIG. 7 herein. Gray balance may be achieved by constraining the 1-D LUTs on the center diagonal such that the output colorants on the line segments from white to black will produce a neutral gray scale ramp. Lower-half hue straightening may be achieved by constraining 1D LUTs from black to pure colors, such that the output colorants on the line segments from primary or secondary colors to black produce color ramps with constant metric hue angle in a perceptual space, e.g. CIELAB, CIELUV, etc. Additional constraints may be applied in the design of the tables to force uniform tone gradations in gray ramps and in ramps from black to primaries and secondaries.

Computational Structure for RGB-to-CMYK Conversion

An objective for the structure of the method of the invention is to obtain a model for converting nominal RGB signals into CMYK colorant signals, which are useable by physical devices, such as printers, copiers, etc. This structure has two parts, as shown in FIG. 3. Upper Half Hue Straightening processing block 34 compensates for hue shifts on the surface of the "upper half" of the RGB cube, which includes the three cube faces that intersect at the White point. Black Generation & Lower Half Hue Straightening processing block 38 controls the use of K and compensates for hue shifts on the surface of the "lower half" of the RGB cube, including the three cube faces that intersect at the Black point.

Black Generation and Lower Half Hue Straightening

Figure 5:
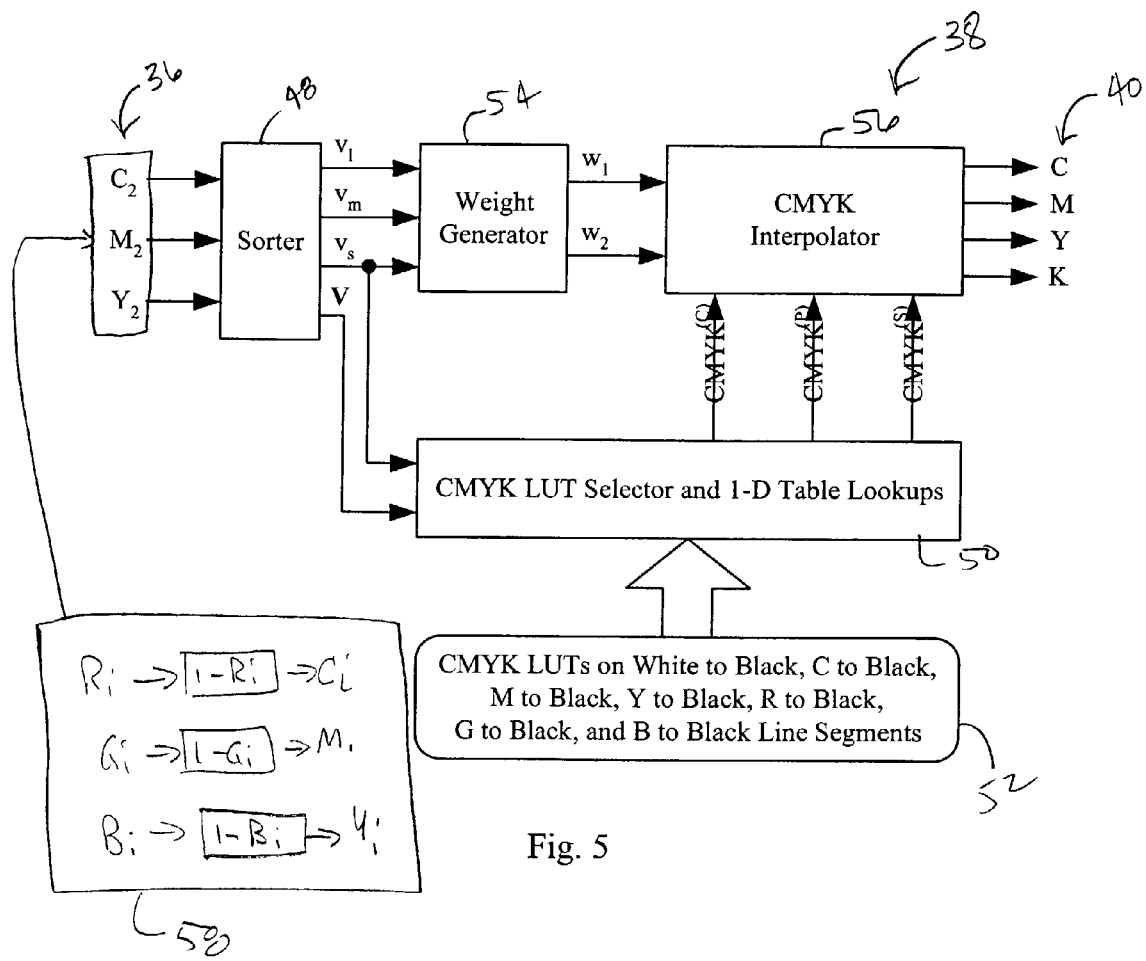
FIG. 5 depicts the computational structure for lower half hue straightening and black generation.

Black Generation & Lower Half Hue Straightening processing 38 is now described in detail. Block 38 is an extension of the traditional UCR and GCR implementation, and converts nominal CMY signals into printer CMYK signals. The parameters for this processing block are seven sets of 1-D CMYK LUTs, located on the center diagonal and on the boundary line segments from C to black, M to black, Y to black, R to black, G to black, and B to black, respectively, on the surface of the CMY cube. The heavy lines in FIG. 1 illustrate where these seven sets of CMYK LUTs conceptually reside. These LUTs may be specified independently of each other. The curves embodied in these LUTs have the same general shapes as those of FIGS. 2(b)–(d). The computational structure for utilizing these 1-D LUTs to convert nominal CMY signals to printer CMYK signals is shown in FIG. 5.

It is well known in tetrahedral interpolation techniques that a unit signal cube may be partitioned, based on the relative magnitudes of the three signal components, into six tetrahedra which share the cube's center diagonal as a common edge. For the CMY cube of FIG. 1, the six tetrahedra's vertices are C-B-black-White, C-G-black-White, M-B-black-White, M-R-black-White, Y-G-black-White, and Y-R-black-White. They correspond to the following respective orderings of the input CMY signal components: CMY, CYM, MCY, MYC, YCM, and YMC, where the first component is the largest and the last component is the smallest. The first step of the conversion process is to sort the input CMY components, $V_l$, $V_m$, $V_s$, where $V_l \geq V_m \geq V_s$, into descending order with a sorter 48. The signal V in FIG. 5 represents the ordering information. Subscripts "l," "m," and "s" indicate the largest, middle, and smallest of the input CMY signal components, respectively, thus $V_l \geq V_m \geq V_s$. The ordering information is carried by signal V, to a LUT selector 50, which is used to select CMYK LUTs used for interpolation. Once the tetrahedron is identified by order signal V, three sets of CMYK LUTs on three edges of the tetrahedron are selected by the CMYK LUT selector, block 50. A weight generator 54 defines $w_1$ and $w_2$, which, along with the selected CMYK LUT, is input to a CMYK interpolator 56.

Figure 6:
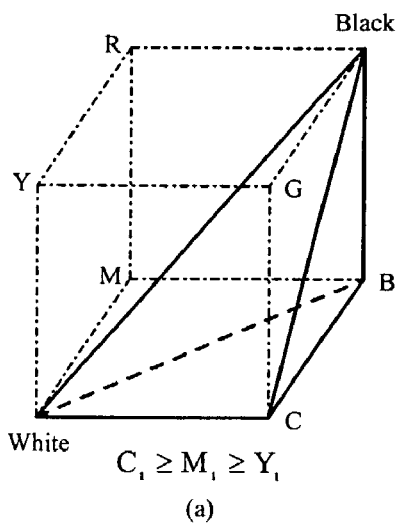
FIGS. 6a–6f depict an input CMY cube which is partitioned into six tetrahedra.
Figure 6:
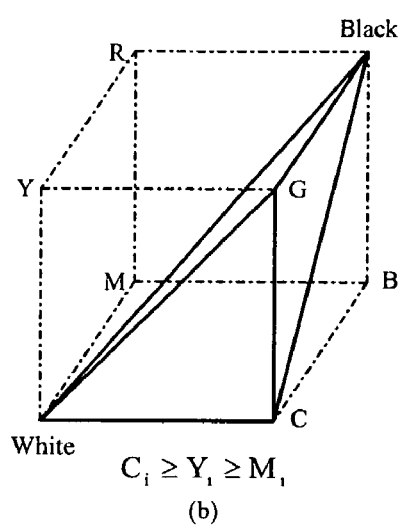
Figure 6:
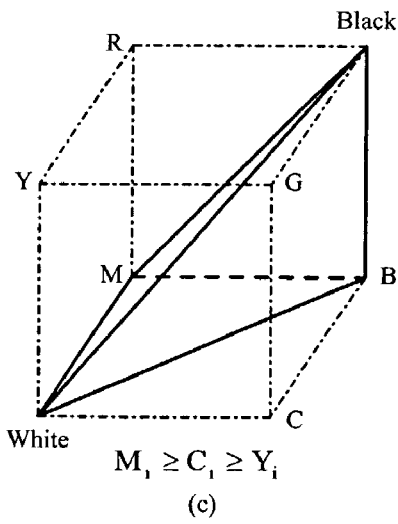
Figure 6:
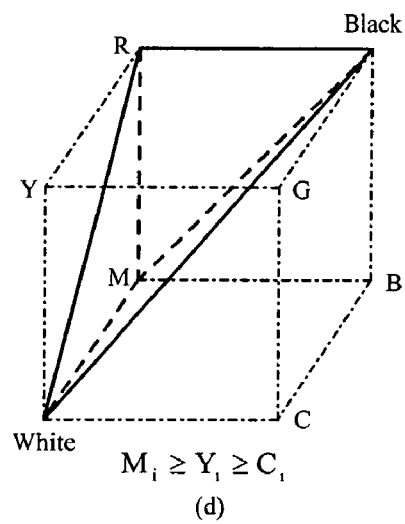
Figure 6:
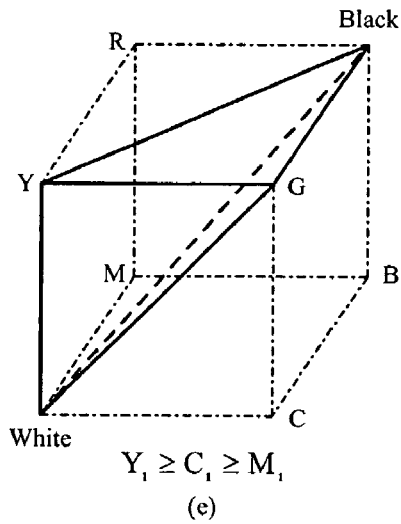
Figure 6:
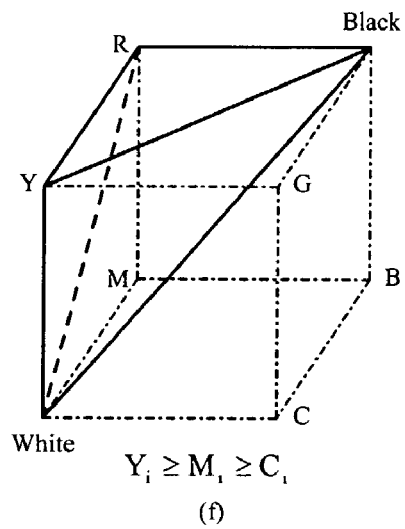
Figure 7:
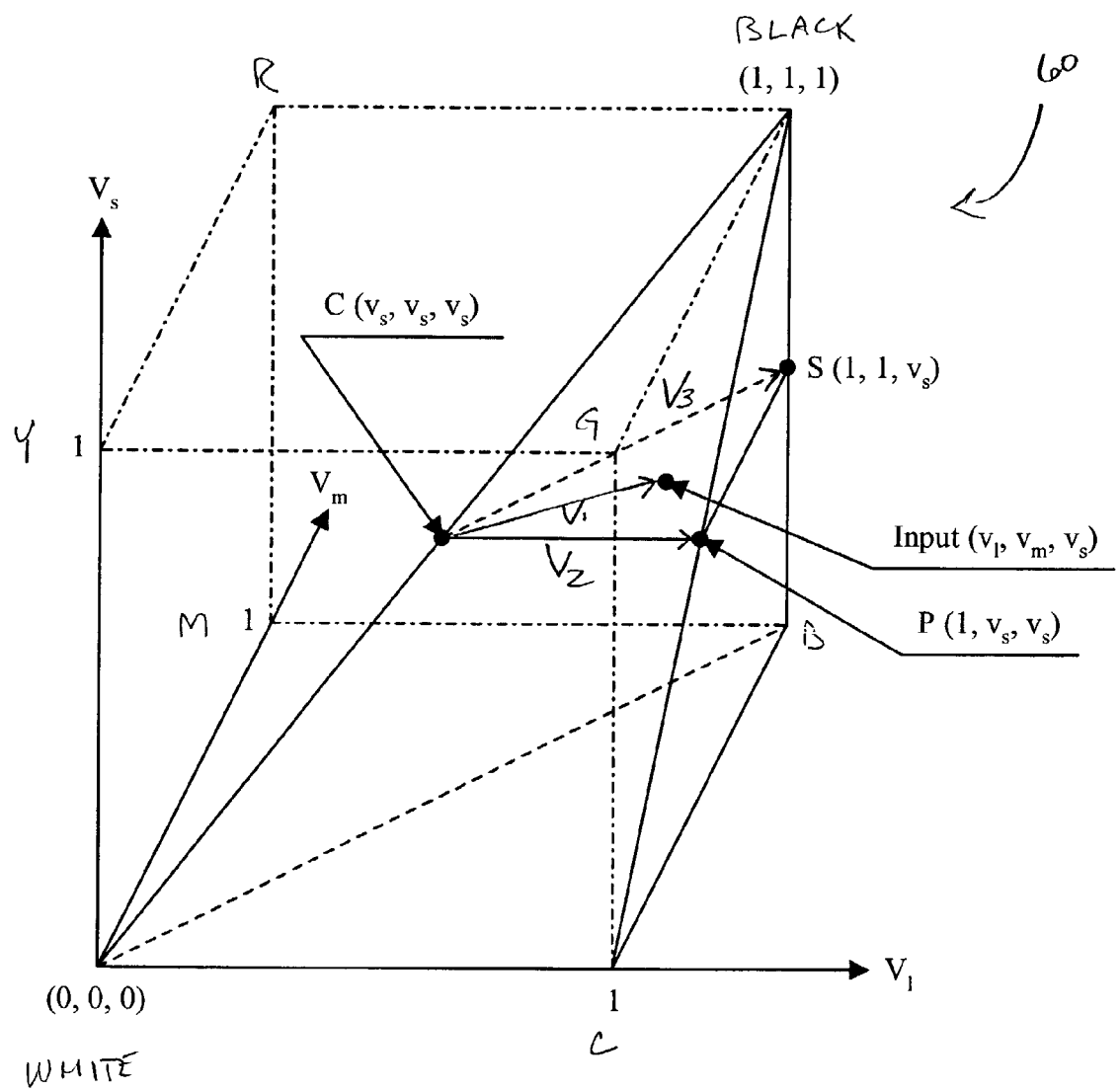
FIG. 7 is a geometric interpretation of the table look-up and interpolation process.

The interpolation process of the present method of the invention is basically the same as that of the related application. As shown in FIG. 6, the input CMY cube may be partitioned into six tetrahedra. For an arbitrary input CMY point, its enclosing tetrahedron may be determined by the ordering information of the CMY signals. The output CMYK signals for the input CMY point will be interpolated from the CMYK LUTs on the three edges that connect white, a primary color, and an adjacent secondary color, to black on its enclosing tetrahedron. For example, if the input CMY point satisfies the condition $C_i \geq M_i \geq Y_i$, where i=2, its enclosing tetrahedron will be the one shown in FIG. 6*a*, whose vertices are the black, white, cyan and blue vertices of the cube. The CMYK output signals will be determined by interpolating from the CMYK LUTs 52 (FIG., 5) on the center diagonal from white to black, the line segment connecting cyan to black, and the one connecting blue to black. The order signal V is used to select a tetrahedron containing the input CMY point. The smallest of the input CMY signals, $V_s$, is then used as the index into these sets of CMYK LUTs ($LUT_C$, $LUT_P$ and $LUT_S$) to look up three sets of intermediate CMYK signals, $CMYK^{(C)}$, $CMYK^{(P)}$ and $CMYK^{(S)}$, respectively, e.g., the CMYK LUTs on three edges of this tetrahedron are then used to obtain the output printer CMYK signals. Finally, output CMYK signals 40 are interpolated from the three sets of intermediate CMYK signals by CMYK interpolator 56. The interpolation process includes Weight Generator 54, which generates the weighting factors for interpolation, and CMYK Interpolator 56, which performs the interpolation using the weighting factors. The interpolation process is illustrated in FIG. 7, generally at 60, which shows the chosen tetrahedron in the coordinate system of the re-ordered input CMY signals. FIG. 7 depicts the intersection of the plane of constant $V_S$ that contains the input CMY point with the tetrahedral edges where the CMYK LUTs reside. The three intersection points "C," "P," and "S" correspond to the indices into the $LUT_C$, $LUT_P$, and $LUT_S$, respectively, and which form a section through a specific tetrahedron, which section is defined as a function of the input signal set. Within this geometric interpretation, the method of the invention obtains final output CMYK signals 40 by linear interpolation of the values retrieved from $LUT_C$, $LUT_P$ and $LUT_s$ within the triangle connected by points "C" (center), "P" (primary), and "S" (secondary). The relative location of the input CMY point within this triangle determines the weighting factors for the triangular interpolation, which may be obtained by solving the following equation:

$$\begin{bmatrix} v_l \\ v_m \end{bmatrix} - \begin{bmatrix} v_s \\ v_s \end{bmatrix} = w_1 \left( \begin{bmatrix} 1 \\ v_s \end{bmatrix} - \begin{bmatrix} v_s \\ v_s \end{bmatrix} \right) + w_2 \left( \begin{bmatrix} 1 \\ 1 \end{bmatrix} - \begin{bmatrix} v_s \\ v_s \end{bmatrix} \right) \quad (4)$$

Still referring to FIG. 7, the vector ($V_1$) on the left hand side of Eq. (4) represents the location of the input CMY point, relative to point "C", the first vector ($V_2$) on the right hand side of Eq. (4) represents the location of point "P" in relation to point "C" and the second vector ($V_3$) on the right hand side of Eq. (4) represents the location of point "S" in relation to point "C." The solution of this equation is given by:

$$w_1 = \frac{v_l - v_m}{1 - v_s}; \quad w_2 = \frac{v_m - v_s}{1 - v_s} \quad (5)$$

With these weighting factors, final output CMYK signals 40 are obtained by:

$$\begin{bmatrix} C_0 \\ M_0 \\ Y_0 \\ K_0 \end{bmatrix} = (1 - w_1 - w_2) \begin{bmatrix} C^{(C)} \\ M^{(C)} \\ Y^{(C)} \\ K^{(C)} \end{bmatrix} + w_1 \begin{bmatrix} C^{(P)} \\ M^{(P)} \\ Y^{(P)} \\ K^{(P)} \end{bmatrix} + w_2 \begin{bmatrix} C^{(S)} \\ M^{(S)} \\ Y^{(S)} \\ K^{(S)} \end{bmatrix} \quad (6)$$

where the CMYK values with superscripts "(C)," "(P)," and "(S)" correspond to the intermediate CMYK signals at points "C," "P," and "S," respectively.

Upper Half Hue Straightening

By adding a pre-processing block 58, also referred to herein as a first processing block, to the block diagram of FIG. 5, that simply inverts RGB signals to CMY signals, a model for converting input RGB signals into output CMYK signals is obtained. The CMYK LUTs on the center diagonal may be designed such that the color ramp reproduces neutral gray and the L* output response is linear with respect to the input RGB signals. The CMYK LUTs on the six boundary segments may be designed to reproduce a reasonably big color gamut and correct for hue shifts in ramps on the boundary segments from pure colors to black. The output CMYK signals for CMY points in the interior of the cube are interpolated from the output CMYK signals on the center diagonal and the boundaries, and desirable properties such as straight hue and linearity will be approximately preserved at interior points through interpolation. This is referred to herein as a "one-box structure," which is described in relation to FIG. 3, block 38.

However, the one-box structure does not affect the output hue angles for the input CMY points on the upper half faces of the RGB cube, because the interpolation on these faces is based only on the White point and two adjacent pure color points on the polyhedron on the RGB cube connecting R, M, B, C, G, Y, and back to R[1]. There are no interpolation grid points between the pure color point and the White point to correct for hue shifts in this region.

To remedy this, the aforementioned computational structure may be used in what is referred to herein as a "two-box structure," to correct for the hue shifts on the upper half faces of the input RGB cube. Upper Half Hue Straightening processing block 34 of FIG. 3 is constructed to invert input RGB signals to CMY signals, while also correcting the hue shifts of the RGB signals. Black Generation & Lower Half Hue Straightening processing block 38 is designed to take care of the gray balance on the center diagonal and the hue shift issues on the lower half faces of the input RGB cube. So when the Upper Half Hue Straightening processing block 34 is designed and constructed, the $C_2M_2Y_2$ signals, in the second color domain, already possess these desirable properties and the objective of block 34 is to correct the hue shift problems on the upper half of the RGB cube. Because the gray balance issue on the center diagonal is already taken care of, the $C_2M_2Y_2$ signals on the center diagonal may still be obtained by inverting the RGB signals using Eq. (1). However, on the boundaries, 1-D RGB-to-CMY LUTs are used to convert RGB signals into CMY signals. In the method of the invention, six sets of 1-D RGB-to-CMY LUTs are placed on the boundary edges from R, G, B, C, M, and Y to the White point, respectively. The index into these 1-D LUTs is the minimum of the input RGB signals:

$$W_i = \min(R_i, G_i, B_i) \quad (7)$$

Figure 8:
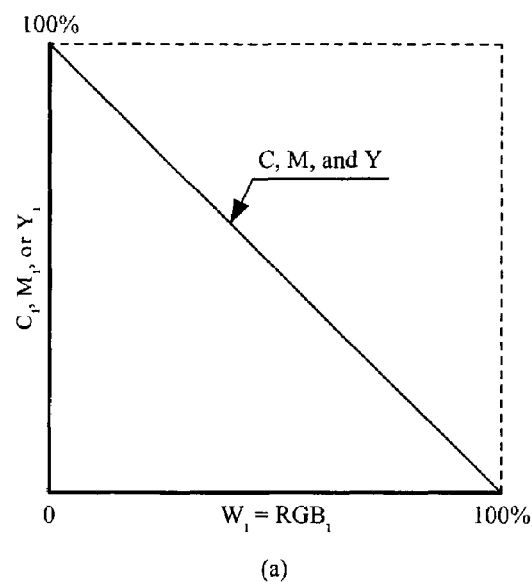
FIG. 8 depicts the 1-D RGB-to-CMY curves on (a) black to white that are fixed and (b) red to white that are designed according to the method of the invention.
Figure 8:
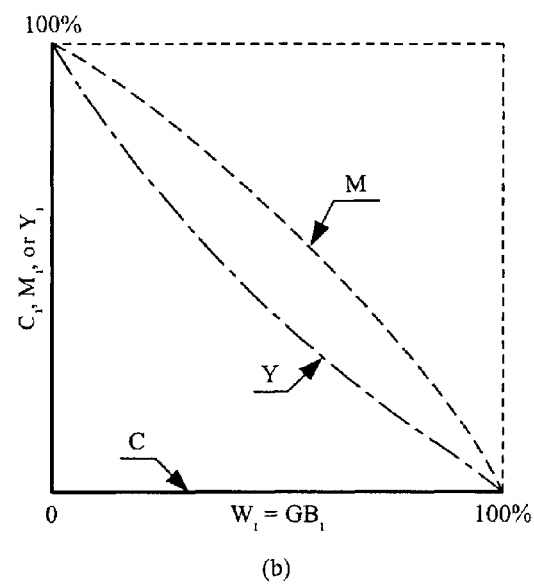

On the center diagonal from black to White, the input R, G, and B signals, referred to herein as the input RGB signal, are equal and the RGB-to-CMY conversion by Eq. (1) may be implemented by the 1-D linear function going from 100% at black to 0% at White, as shown in FIG. 8(*a*). On the R to White boundary, the input R signal is 100% and the input G and B signals referred to as the input GB signal, are equal, going from 0% to 100%. The plots in FIG. 8(*b*) illustrates a typical set of RGB-to-CMY curves on the R to White boundary. The C curve is a constant 0% because the colors on the boundary are to remain the most saturated. The M and Y curves go from 100% to 0%, but the descent is not linear as indicated by Eq. (1). These curves are designed to correct the hue shifts on the R to White boundary which might occur due to colorant mixing behaviors or dot-off-dot halftone effects. The two-box structure may also be a combination of blocks 58 and 38, as shown in FIG. 5.

Figure 9:
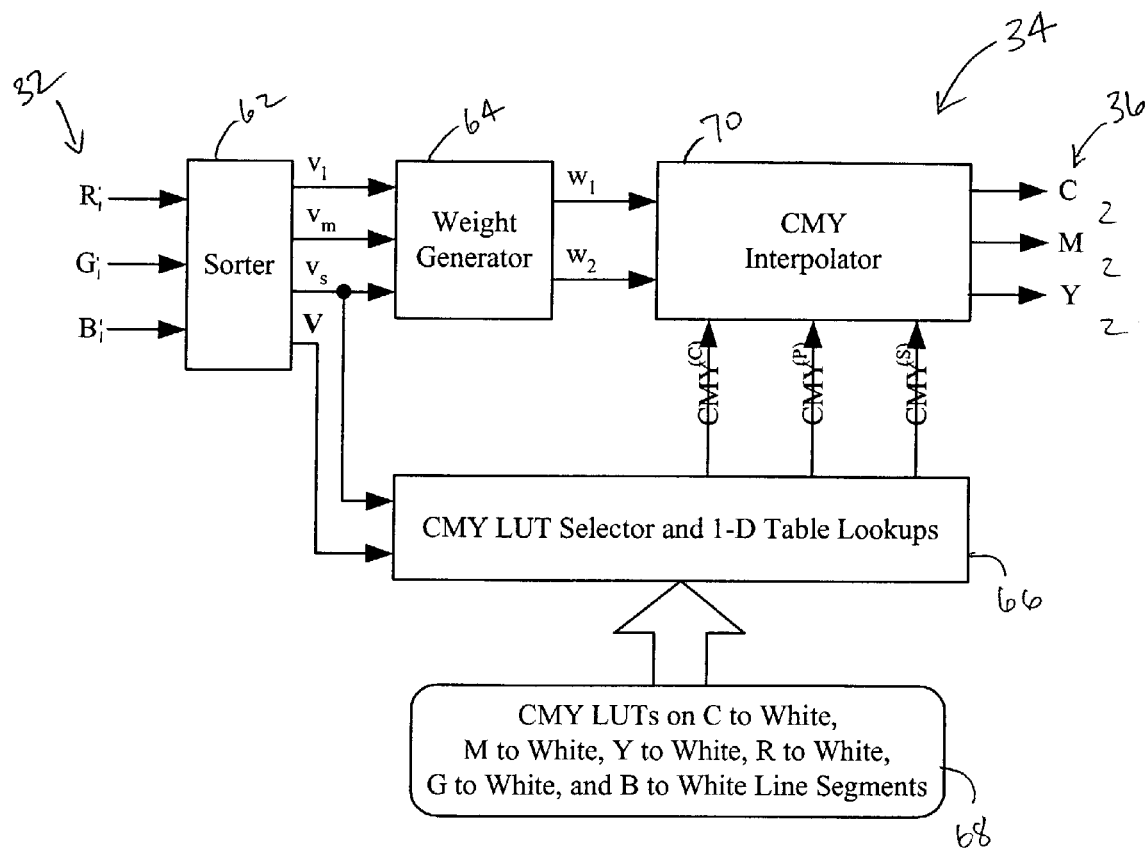
FIG. 9 depicts the computational structure for upper half hue straightening.

Upper Half Hue Straightening processing block 34 is shown in detail in FIG. 9. It is essentially the same as Black Generation & Lower Half Hue Straightening processing block 38, however, the input signals are RGB and the outputs of a sorter block 62 are the ordered RGB signals and their ordering information. Block 34 includes a weight generator 64, CMY LUTs selector 66, LUTs 66, and CMY interpolator 70. There is no K colorant to consider in this processing block. The difference is that in the Upper Half block, no black (K) output signal is present, and the roles of the cube vertices (C, M, Y, K) and (R, G, B, W) are reversed. i.e., R and C are interchanged, G and M are interchanged, etc., in the computation. Among the seven sets of 1-D RGB-to-CMY LUTs 68 for the "CMY LUT Selector and 1-D Table Look-ups" block, only the six on the boundary segments may be flexibly designed. The ones on the center diagonal are fixed as shown in FIG. 8(*a*). In practice, the LUTs on the boundary segments from C, M and Y to white are designed to achieve perceptual linearity, and those on the segments from R, G and B to white are designed both for perceptual linearity and to correct hue shifts due to colorant-mixing and/or dot-off-dot halftone behaviors.

Figure 10:
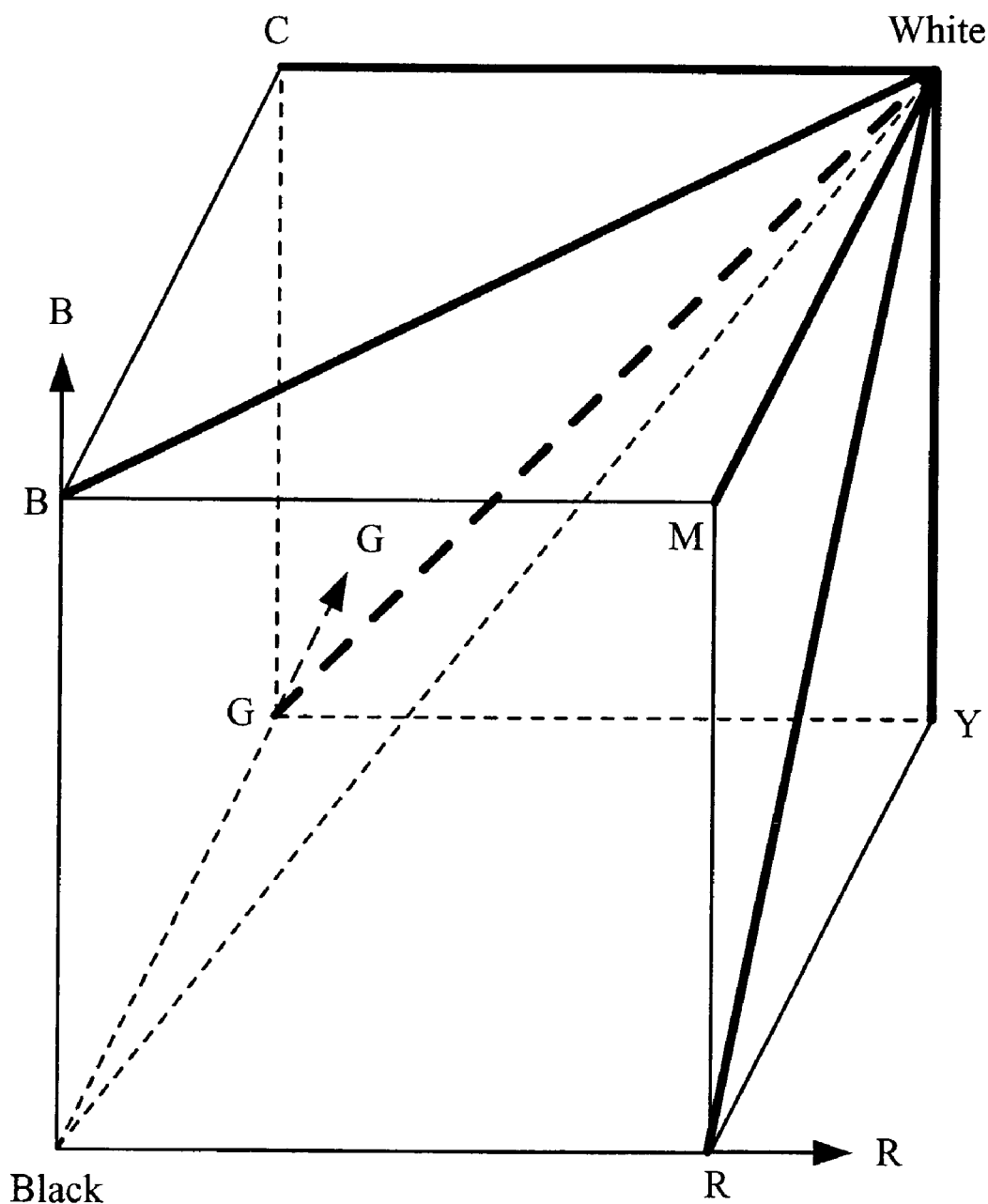
FIG. 10 depicts the input RGB cube for upper half hue straightening.

The input parameters for Upper Half Hue Straightening processing block 34 are six sets of CMY LUTs on the line segments from C, M, Y, R, G, and B, to white, respectively. These line segments are shown in FIG. 10 in heavy lines. The output colors on these line segments are directly determined by the CMY LUTs on them. These LUTs are designed to make sure the hue angles of the color ramps from secondary colors to white nearly constant, and to make their tone scales have some desired property such as perceptual uniformity. In some instances, these LUTs may be used on primary color tone scales.

The geometric interpretation of the interpolation process shown in FIG. 7 is also valid for Upper Half Hue Straightening processing block 34. However, because the inputs are RGB signals, the primary colors are R, G, and B, and the secondary colors C, M, and Y, in terms of the RGB cube. Eq. (5) may still be used to obtain the weighting factors. The CMY signals are obtained by:

$$\begin{bmatrix} C_2 \\ M_2 \\ Y_2 \end{bmatrix} = (1 - w_1 - w_2) \begin{bmatrix} C^{(C)} \\ M^{(C)} \\ Y^{(C)} \end{bmatrix} + w_1 \begin{bmatrix} C^{(P)} \\ M^{(P)} \\ Y^{(P)} \end{bmatrix} + w_2 \begin{bmatrix} C^{(S)} \\ M^{(S)} \\ Y^{(S)} \end{bmatrix} \quad (8)$$

The tetrahedral partitions of the CMY cube, for lower half hue straightening, and the RGB cube, for upper half hue straightening, are identical, so the method of the invention uses the identical computation for interpolation in the RGB cube as is used for interpolation in the CMY cube. However, because the colors from black to white on the center diagonal are already gray-balanced by the "Lower Half Hue Straightening & Black Generation" block, no CMY LUTs are required on the center diagonal. Instead, to generate CMY values on the center diagonal for interpolation purposes, the input RGB signal coordinates may be simply inverted.

The techniques disclosed herein may also be applied to output colorants other than RGB, CMY or CMYK. For example, by defining different LUTs on the edges of the tetrahedra we may handle Hexachrome™, CcMmYK, or other colorant formulations, or other color spaces, e.g., XYZ, Lab, for a signal-to-color simple computational model.

Extension to the Computational Structure

In the computational structure previously described, 1-D LUTs are placed on the center diagonal and boundary segments connecting the primary and secondary colors to the Black and White points on the RGB or CMY cube. The properties of the resulting color outputs on the segments where 1-D LUTs are located can be precisely controlled. However, color outputs in other parts of the input signal cube are not so precise, because they are interpolated from the nearby LUTs. Based on experimental results using a CMYK ink jet printer, the desirable properties on the line segments where LUTs are specified are found to carry over reasonably well to other parts of the input cube. However, sometimes it may be desirable to precisely control the color output in other parts of the input cube. For example, the native printer blue point, where C and M are 100% and Y is 0%, usually has a purplish hue. A more natural blue point is obtained by reducing M while keeping C at 100% and Y at 0%. It may be desirable to precisely control the output hue response along the color ramps from this natural blue point to the black and White points.

The general principle of the computational structure is not limited to placing 1-D LUTs only on the center diagonal and boundary segments from primary and secondary colors to the White and Black points. LUTs may be placed on other line segments inside the input RGB or CMY cube to precisely control the properties of the color output there. However, if more LUTs are added into the computational structure, the ordering information from the input signals alone is not sufficient to select the sets of LUTs to be used for interpolation. Additional processing steps must be provided to make use of the additional LUTs.

Figure 11:
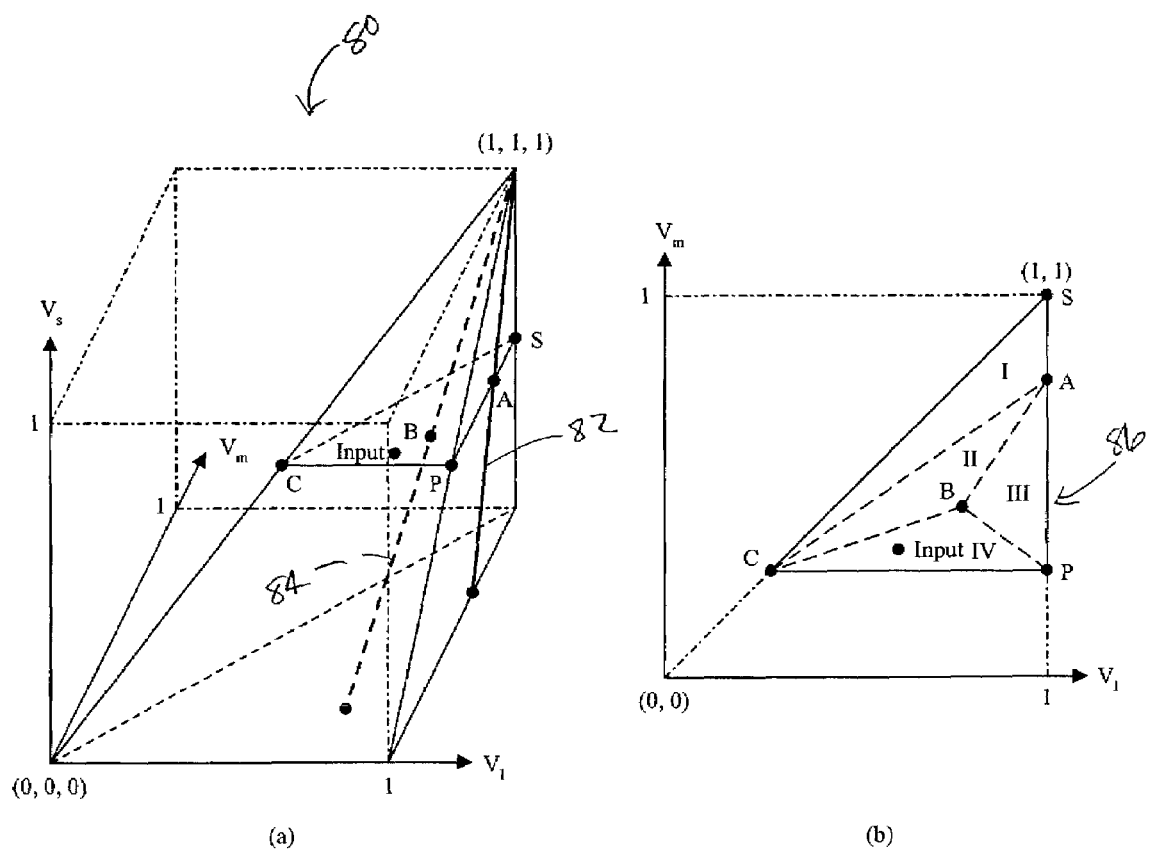
FIG. 11 depicts additional LUTs (a) within and on the face of an input cube and (b) a method for selecting the appropriate LUTs.

The placement of LUTs on additional line segments, within a chosen tetrahedron, is illustrated in FIG. 11(a), generally at 80. In this example, two additional sets of LUTs have been placed on the two heavy lines 82, 84. The plane perpendicular to the $V_S$ axis intersects with the additional line segments at points "A" and "B," as well as at points "C," "P," and "S." A triangle 86 containing the input point is projected onto the plane $V_s$=0, as shown in FIG. 11(b). Intermediate output signals are obtained by direct table look-up at these five intersection points. A scheme is also shown in FIG. 11(b) where triangle 86, bounded by points "C," "P.," and "S," is further partitioned into four sub-triangles, labeled I through IV. The Δ input point must be determined to select the proper set of vectors and the proper set of LUTs. The input point is tested algebraically by inverting the matrices to determine which of the four triangles contain the input point. The final output signals are interpolated from the intermediate ones at the three vertices of the sub-triangle enclosing the input point. The partitioning scheme of FIG. 11(b) is offered by way of example only, as the best partitioning scheme will depend on the specific application.

An alternate form of the method of the invention may partition the RGB/CMY signal cube into more than six tetrahedra. For example, one or more of the six disclosed tetrahedra may be partitioned by introducing additional vertices on the tetrahedral edge connecting the primary to the adjacent secondary. It is also possible to use certain other line segments in addition to the center diagonal or the disclosed segments on the surface of the cube, to obtain finer divisions of the cube. For example, additional vertices may be introduced on the base of a tetrahedron where $V_s$=0. In such cases, the interpolation method disclosed herein will work essentially the same way. The main difference is that more sophisticated algorithms are required for identifying the tetrahedron enclosing an input signal vector.

Experimental Results

From the development of the computational structure and its extension, it is apparent that this structure can be used to control various aspects of the RGB-to-CMYK, or RGB-to-RGB, etc., conversion process. In experiments using the method of the invention, the issues of hue straightening and the output color gamut of the model for RGB-to-CMYK conversion were considered important, and were the focus of the work. The two-step method of the invention, as shown in FIG. 3, was constructed, and the seven sets of CMYK LUTs for the "Black Generation & Lower Half Hue Straightening" module and the six sets of the CMY LUTs for the "Upper Half Hue Straightening" module were designed. The printer gamut is shown in the CIELAB space. For hue straightening, the hue angle was corrected in the CIELUV space. although other color spaces may be used.

Figure 12:
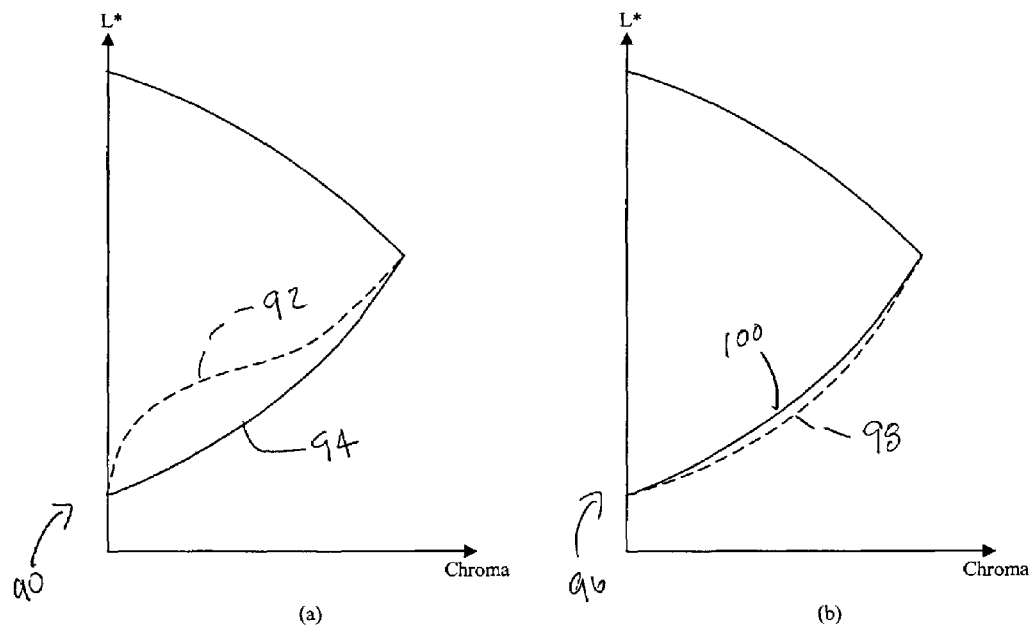
FIG. 12 is a graphical comparison of color gamut of the red leaf obtained by the method of the invention and (a) that by the traditional UCR and GCR implementation, and (b) that obtained by full CMYK gamut.
Figure 13:
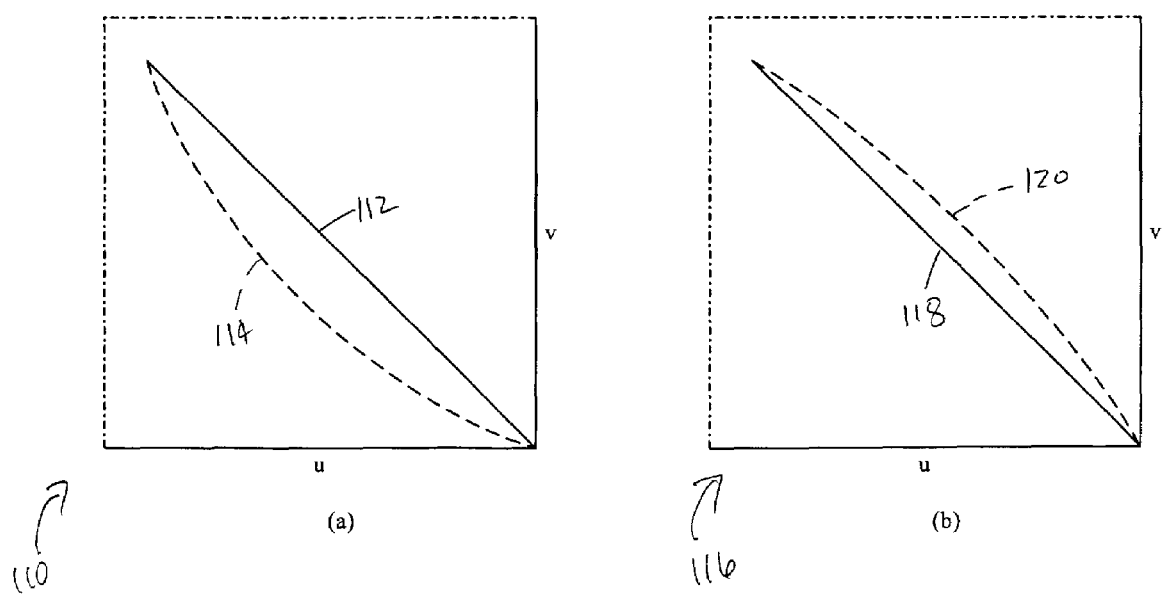
FIG. 13 is a graphical comparison of hue angle in the CIELUV space between (a) the hue line resulting from the traditional UCR and GCR implementation and that from the method of the invention on the green to black line, and (b) the corrected and uncorrected hue on the green to white line.

Experimental results from a CMYK ink jet printer are shown in FIGS. 12a and 12b, generally at 90, 96, respectively, and in FIG. 13, generally at 110. In FIG. 12(a), the color gamut of the simple UCR and GCR implementation, line 92, and that of the computational structure of the method of the invention, line 94, on the red hue leaf, are compared. The results demonstrate that the method of the invention is able to provide a much bigger gamut in the shadow area. The gamut of the red leaf obtained by the method of the invention is further compared with the full CMYK gamut at this hue angle in FIG. 12(b), generally at 96. The full CMYK gamut is shown by line 98, and the gamut leaf obtained by the computational structure of the method of the invention is shown by line 100. FIG. 12 demonstrates that the gamut leaf obtained by the method of the invention is very close to the full CMYK gamut. The effectiveness of hue straightening is shown in FIGS. 13(a), (b), generally at 110, 116, respectively. In both figures, the corrected hue is shown in solid line. In FIG. 13(a), corrected hue line 112 from green to black is compared with the hue obtained from the traditional implementation shown in line 114. The comparison between the corrected hue line 118 and the uncorrected hue line 120 from green to white is shown in FIG. 13(b).

An efficient computational structure to convert input RGB signals into output printer CMYK signals has been developed. This structure can be used to model a CMYK printer as an RGB printer. It is easier to profile an RGB printer because there is a one-to-one correspondence between RGB signals and colors specified in a colorimetric space, such as the CIELAB space or the sRGB space. The computational structure of the method of the invention may be considered as an extension to the simple implementation of the traditional UCR and GCR techniques using 1-D BG and UCR LUTs. In this structure, multiple sets of 1-D LUTs may be strategically placed on various parts of the input RGB or CMY cube to control the output response of the modeled RGB printer. The placement of the 1-D LUTs naturally partitions the input RGB or CMY cube to into several tetrahedra and the LUTs on the edges of a tetrahedron are used to interpolate the output CMYK signals for input points within the tetrahedron. The computational structure of the method of the invention is used to construct a two-step process for RGB-to-CMYK conversion to achieve a reasonably big color gamut and correct for the hue shift problems caused by e.g., halftones or colorants. Experimental results demonstrate that this model can achieve a color gamut almost as big as the entire CMYK gamut and that the hue shift problems are successfully corrected. The application of this computational structure is not limited to printer RGB-to-CMYK conversion. It may be applied to modeling printers with more than four inks or colorants. It may also be used to compensate for undesirable behaviors of devices other than printers.

Thus, a method for color conversion with hue straightening using multiple look-up tables and interpolation has been disclosed. It will be appreciated that further variations and modifications thereof may be made within the scope of the invention as defined in the appended claims.

We claim:

1. A method of color conversion comprising:
providing a first color domain input signal set having plural input signals, including compensating for hue shifts in the first color domain by inputting a CMY input signal and black generation;
sorting the input signals of the first color domain input signal set according to signal intensity, including sorting the input signal sets into color domain components, $V_l, V_m, V_S$, where $V_l \geq V_m \geq V_s$, and generating an order signal;
designing and generating plural CMYK 1-D look-up table sets for color polyhedrons;
selecting a set of look-up tables for use with a specific color polyhedron, wherein said selecting is determined as a function of the input signal set;
looking up values in the look-up table set as a function of a section of the specific color polyhedron;

generating weights as a function of the sorted signal intensities, wherein generating weights includes generating weights $w_1$ and $w_2$ as a function of $V_l, V_m, V_s$;

selecting a look-up table as a function of the sorted components and the order signal; and interpolating the output from the selected look-up tables as a function of the selected look-up table and the generated weights to produce a CMYK color domain signal set which is converted to a desired color domain signal set, including interpolating the color domain components with the weights and selected look-up table to provide a signal set for a desired color domain.

2. The method of claim 1 wherein said compensating for hue shifts in the first color domain includes inputting a RGB input signal; designing and generating CMY 1-D look-up tables; and interpolating to provide a CMY signal set.

3. The method of claim 1 wherein said designing and generating CMYK 1-D look-up tables includes specifying independent look-up tables for each primary color and each secondary color and black.

4. The method of claim 3 wherein said designing and generating CMYK 1-D look-up tables includes controlling hue angles.

5. The method of claim 3 wherein said designing and generating CMYK 1-D look-up tables includes controlling metric spacing of color ramps.

6. The method of claim 1 wherein said designing and generating CMY 1-D look-up tables includes specifying independent look-up tables for each primary color and each secondary color.

7. The method of claim 6 wherein said designing and generating CMY 1-D look-up tables includes controlling hue angles and metric spacing of color ramps.

8. The method of claim 1 wherein said compensating for hue shifts in the first color domain includes inputting a CMY input signal; designing and generating CMY 1-D look-up tables; and interpolating to provide a RGB signal set.

9. The method of claim 1 which further includes processing the desired color domain signal set includes black generation.

10. The method of claim 9 wherein said providing a first color domain input signal set includes providing a RGB signal set, and which includes generating a final colorant signal set, including generating a CMYK signal set.

11. The method of claim 1 wherein said providing a first color domain input signal set includes providing a RGB signal set, and which includes generating a final colorant signal set, including generating a modified first color domain signal set which is a RGB signal set.

12. The method of claim 1 which includes processing the first color domain input signal set in a upper half hue straightening module wherein all colors are processed, including compensating for hue shifts, to generate a second color domain signal set; and processing the second color domain signal set in a lower half hue straightening module wherein colors between pure colors and black are processed, including compensating for hue shifts, to generate a final colorant signal set in the desired color domain.

13. The method of claim 12 wherein said processing the second color domain input signal includes sorting the input signals according to signal intensity; designing and generating 1-D look-up tables for color line segments; selecting a specific look-up table; generating weights as a function of the sorted signal intensities; and interpolating the input signals to generate the final colorant signal set.

14. The method of claim 12 wherein said compensating for the first color domain includes inputting a RGB input signal; designing and generating CMY 1-D look-up tables; and interpolating to provide a CMY signal set.

15. The method of claim 14 wherein said compensating for the second color domain includes inputting a CMY input signal and black generation; designing and generating CMYK 1-D look-up tables; and interpolating to provide a CMYK signal set.

16. The method of claim 15 wherein said designing and generating CMYK 1-D look-up tables includes specifying independent look-up tables for each primary color and each secondary color and black.

17. The method of claim 16 wherein said designing and generating CMYK 1-D look-up tables includes controlling metric spacing of color ramps.

18. The method of claim 16 wherein said designing and generating CMYK 1-D look-up tables includes controlling hue angles.

19. The method of claim 12 wherein said compensating for the second color domain includes inputting a CMY input signal; designing and generating CMY 1-D look-up tables; and interpolating to provide a RGB signal set.

20. The method of claim 12 wherein said designing and generating CMY 1-D look-up tables includes specifying independent look-up tables from each primary color and each secondary color.

21. The method of claim 20 wherein said designing and generating CMY 1-D look-up tables includes controlling hue angles.

22. The method of claim 20 wherein said designing and generating CMY 1-D look-up tables includes controlling metric spacing of color ramps.

23. The method of claim 12 wherein said processing the second color domain signal set includes black generation.

24. The method of claim 23 wherein said providing a first color domain input signal set includes providing a RGB signal set, and wherein generating final colorant signal set includes generating a CMYK signal set.

25. The method of claim 12 wherein said providing a first color domain input signal set includes providing a RGB signal set, and wherein generating final colorant signal set includes generating a modified first color domain signal set which is a RGB signal set.

26. A method of color conversion comprising:

providing a RGB input signal set;

processing the RGB input signal set in a upper half hue straightening module wherein colors are processed, including compensating for hue shifts, to generate a second color domain signal set, and which further includes sorting the input signals according to signal intensity; designing and generating 1-D look-up tables for color line segments; selecting a specific look-up table set; generating weights as a function of the sorted signal intensities; and interpolating the values from the look-up table set to generate a CMY signal set; and processing the second color domain signal set in a lower half hue straightening and black generation module wherein all colors are processed, including compensating for hue shifts, to generate a final colorant signal set.

27. The method of claim 26 which further includes processing the CMY signal set includes sorting the input signals according to signal intensity; designing and generating 1-D look-up tables for color line segments and achromatic line segments; selecting a specific look-up table set; generating weights as a function of the sorted signal intensities; and interpolating the look-up table signals to generate a CMYK colorant signal set.

28. The method of claim 26 wherein said compensating for hue shifts includes sorting signal sets into color domain components, $V_l, V_m, V_s$, where $V_l \geq V_m \geq V_s$; generating an order signal, designing and generating a 1-D look-up table for the color domain, generating weights $w_1$ and $w_2$ as a function of $V_l, V_m, V_s$, selecting a look-up table as a function of the sorted components and the order signal, and interpolating the color domain components with the weights and selected look-up table to provide another color domain signal set.

29. The method of claim 28 wherein said compensating for the RGB signal set includes designing and generating second color domain 1-D look-up tables; and interpolating to provide the second color domain signal set.

30. The method of claim 29 wherein said compensating for the second color domain signal set includes black generation; designing and generating final color domain 1-D look-up tables; and interpolating to provide the final colorant signal set.

31. The method of claim 30 wherein said designing and generating the second color domain 1-D look-up tables and final 1-D look-up tables includes specifying independent look-up tables for each primary color and each secondary color and black.

32. The method of claim 26 wherein said designing and generating second color domain 1-D look-up tables and final 1-D look-up tables includes controlling hue angles.

33. The method of claim 26 wherein said designing and generating second color domain 1-D look-up tables and final 1-D look-up tables includes controlling metric spacing of color ramps.

34. The method of claim 26 which includes preprocessing an RGB input signal by inversion to generate a CMY input signal.

* * * * *